United States Patent [19]

Dhooge

[11] Patent Number: 4,699,700

[45] Date of Patent: Oct. 13, 1987

[54] METHOD FOR HYDROGEN PRODUCTION AND METAL WINNING, AND A CATALYST/COCATALYST COMPOSITION USEFUL THEREFOR

[75] Inventor: Patrick M. Dhooge, Corrales, N. Mex.

[73] Assignee: Delphi Research, Inc., Albuquerque, N. Mex.

[21] Appl. No.: 864,411

[22] Filed: May 19, 1986

[51] Int. Cl.[4] .............................................. C25B 1/02
[52] U.S. Cl. ................................ 204/105 R; 204/129; 204/130; 204/291; 204/294; 502/224; 502/230; 502/304; 502/338
[58] Field of Search ............... 502/224, 230, 304, 338; 204/129, 105 R, 130, 294, 291; 106/1

[56] References Cited

U.S. PATENT DOCUMENTS

| | | | |
|---|---|---|---|
| 2,433,871 | 1/1948 | Sutherland et al. | 204/129 |
| 3,884,952 | 5/1975 | Kober et al. | 502/230 |
| 4,105,755 | 8/1978 | Darnell et al. | 423/648 R |
| 4,182,662 | 1/1980 | Hart | 204/101 |
| 4,235,863 | 11/1980 | Schulten et al. | 423/648 R |
| 4,268,363 | 5/1981 | Coughlin | 204/39 |
| 4,279,710 | 7/1981 | Coughlin | 204/101 |
| 4,311,569 | 1/1982 | Dempsey et al. | 204/130 |
| 4,341,608 | 7/1982 | St. John | 204/129 |
| 4,389,288 | 6/1983 | Vaughan | 204/101 |
| 4,395,316 | 7/1983 | St. John | 204/129 |
| 4,412,893 | 11/1983 | Fray et al. | 204/103 R |
| 4,457,824 | 7/1984 | Dempsey et al. | 204/290 R |

OTHER PUBLICATIONS

Dhooge et al., "Electrochemical Studies of Coal Slurry Oxidation Mechanisms, J. Electrochem. Soc., 129, No. 8, Aug. 1982, pp. 1719–1724.
Dhooge et al., "Electrochemistry of Coal Slurries", J. Electrochem. Soc., 130, No. 5, May 1983, pp. 1029–1036.
Dhooge et al., "Electrochemistry of Coal Slurries III", J. Electrochem. Soc., 130, 1539 (1983).

Primary Examiner—R. L. Andrews
Attorney, Agent, or Firm—Berman, Aisenberg & Platt

[57] ABSTRACT

A catalyst/cocatalyst/organics composition of matter is useful in electrolytically producing hydrogen or electrowinning metals. Use of the catalyst/cocatalyst/organics composition causes the anode potential and the energy required for the reaction to decrease. An electrolyte, including the catalyst/cocatalyst composition, and a reaction medium composition further including organic material are also described.

19 Claims, 3 Drawing Figures

METHOD FOR HYDROGEN PRODUCTION AND METAL WINNING, AND A CATALYST/COCATALYST COMPOSITION USEFUL THEREFOR

STATEMENT

This invention was made with the support of the State of New Mexico under Project No. 2-73-4633 awarded by the New Mexico Energy Research and Development Institute. New Mexico has reserved rights in this invention.

FIELD OF THE INVENTION

This invention relates to a catalyst composition of an electrocatalyst and a homogeneous cocatalyst, and use of the catalyst composition in combination with organic material for the electrochemical production of hydrogen or reduction of metal ions to metal in an aqueous electrolyte.

CROSS REFERENCE TO RELATED APPLICATION

A related application, Ser. No. 864,410 entitled "A method for treating organic waste material and a catalyst/cocatalyst composition useful therefor" has been filed concurrently herewith, and the specification thereof is incorporated herein by reference.

BACKGROUND OF THE INVENTION

Carbonaceous materials are oxidized when suspended in an aqueous electrolyte containing a reversible or quasireversible electrocatalyst and a homogeneous cocatalyst. The electrocatalyst is regenerated in an electrochemical cell through which a direct current is passed, the water being reduced to form hydrogen, or the metal ions being reduced to metal, at the cathode. The reduced electrocatalyst is reoxidized at the anode.

U.S. Pat. No. 4,412,893 concerns electrolyzing cations at a cathode of an electrolytic cell, wherein anolyte contains ferrous ion as a reducing agent. The electrolysis is conducted while the anolyte is agitated or while the anode moves with respect to the anolyte, providing relative motion between the anode and the anolyte, promoting contact of the anode with the ferrous ion despite their mutual electrostatic repulsion. A static relationship between the cathode and the catholyte is required. The concentration of the ferrous ion is in the range from 0.5 to 10 grams per liter.

U.S. Pat. No. 4,389,288 relates to electrochemical gasification of carbonaceous material by anodic oxidation in an aqueous acidic electrolyte to produce oxides of carbon at the anode and hydrogen at the cathode of an electrolytic cell using an iron catalyst.

U.S. Pat. No. 4,268,363 provides for electrochemical gasification of carbonaceous materials by anodic oxidation, producing oxides of carbon at the anode and hydrogen or metallic elements at the cathode of an electrolytic cell. Carbonaceous materials may also be hydrogenated at the cathode by electrochemical reactions during which carbonaceous material may also be anodically reacted within the anode compartment of an electrolytic cell. Typical examples of metals produced at the cathode include chromium, manganese, cobalt, nickel, copper, indium, and tellurium.

According to U.S. Pat. No. 4,341,608, hydrogen is produced from an electrolytic cell system by oxidizing a biomass product using a process of depolarizing the anode of an aqueous electrolytic cell. Particular catalyst systems are not disclosed.

U.S. Pat. No. 4,279,710 presents an electrochemical method and associated apparatus for gasification of carbonaceous materials to carbon dioxide with the attendant formation of fuels or high-energy intermediates, such as hydrogen or light hydrocarbons, and production of electric power. No particular catalyst systems are disclosed.

U.S. Pat. No. 4,235,863 considers a method of producing hydrogen in an electrolytic system using a hydride-forming liquid metal, such as liquid lithium or liquid sodium, the resulting hydride being thermally decomposed to produce hydrogen.

U.S. Pat. No. 4,182,662 relates to a method of forming hydrogen by electrolysis in a cell containing an aqueous acid solution. Catalysts used are graphitized carbon, ruthenized titanium or platinized titanium.

U.S. Pat. No. 4,395,316 is an improvement on the process of U.S. Pat. No. 4,341,608, which uses an anode of lead-rich ruthenium polychlore compounds.

In U.S. Pat. No. 4,311,569, an improved catalytic anode of a ternary platinum group reduced metal oxide is used alone or in combination with platinum group metals and/or platinum group metal oxides or mixtures having at least one valve-metal component, such as titanium, hafnium, zirconium, niobium, tantalum, and tungsten, in a process for electrolytically generating oxygen. The invention of U.S. Pat. No. 4,457,824 is an improvement on the same method. In these two patents, the catalysts are in the electrodes, and thus are not available in solution for homogeneous oxidation of any dissolved organics. Oxidation of organic materials using catalytic electrodes is not shown or suggested.

U.S. Pat. No. 2,433,871 provides an electrolytic cell for production of hydrogen and oxygen using alkaline aqueous electrolyte and a vanadium addition agent to reduce the operating voltage.

U.S. Pat. No. 4,105,755 concerns the production of hydrogen by reacting an ash-containing carbonaceous material, optionally on organic waste material, with a halogen to form a halogen acid, and then decomposing the halogen acid to halogen (recycled) and hydrogen. The halogen acid is preferably decomposed electrolytically if this step of the reaction takes place as a separate step from the initial reaction of the ash-containing carbonaceous material and halogen.

SUMMARY OF THE INVENTION

An object of the present invention is to provide an electrocatalytic reactor system in which the anode is depolarized by organic material oxidation using a catalyst/cocatalyst combination in an aqueous electrolyte in an electrochemical cell, hydrogen being generated, or metal ions reduced to metal, at the cathode. The overall reactions in the anode half-cell and in the cathode half-cell are:

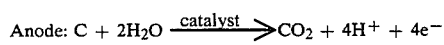

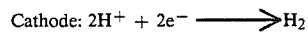

(M = metal)

The process employs one of several electrocatalysts together with one of several homogeneous cocatalysts to improve the organic oxidation rate and to lower the activation energy for the oxidation of the organic material.

Another object of the invention is to provide a novel catalyst/cocatalyst composition of matter. A further object of the invention is to provide a method of using the catalyst/cocatalyst composition of the invention for the production of hydrogen or for the reduction of metal ions to metal. Yet another object of the invention is to provide an anolyte composition comprising organic material, a conductive electrolyte, catalyst and cocatalyst.

There are several distinct aspects of this invention:
(a) a catalyst/cocatalyst composition,
(b) use of (a) in a method of producing hydrogen electrolytically,
(c) use of (a) in a method of electrowinning metals electrolytically,
(d) use of (a) to reduce potential and thus energy required to produce hydrogen or reduce metal ions to metal,
(e) an aqueous electrolyte composition comprising (a), and
(f) a reaction medium composition comprising organic material in (e).

Component (a) is an indispensable subcombination of each of the other aspects of the invention. The dispersion of (a) throughout the anolyte composition imparts homogeneity to the distribution of the catalyst and of the catalyst.

The benefits derived from use of the catalyst/cocatalyst are several. The production of hydrogen (b) or electrowinning of metals (c) at reduced potentials is an energy-saving, economical process. Likewise, an increase in reaction rates using the catalyst/cocatalyst combination (a) provides energy-saving economy.

DETAILED DESCRIPTION OF THE INVENTION

Figure 1:
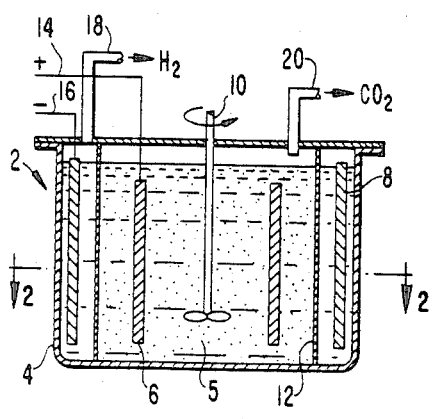
FIG. 1 is a vertical sectional view of an electrochemical cell useful for practicing the invention.

In the process of the invention hydrogen gas is generated or metal ions reduced to metal in an electrolytic cell. At the cathode of the electrolytic cell, hydronium ion is reduced to hydrogen. The reaction at the anode is a mediated, or electrocatalytic, reaction in which the oxidized form of a reversible redox couple, produced at the anode, subsequently oxidizes the carbon in organic material present in the electrolytic cell. The products of the carbon oxidation are carbon oxides and the reduced form of the redox couple, which is reoxidized at the anode. The process described herein employs one of several electrocatalysts along with one of several homogeneous cocatalysts to improve the organic oxidation rate and to lower the activation energy required for the oxidation of the organic material. Obtained data shown that the mechanism of the organic oxidation is changed by the homogeneous cocatalyst, which apparently forms an electron transfer complex involving the electrocatalyst. This results in improvement in reaction rate and/or lowering of activation energies.

The electron transfer complex must exist at least momentarily to account for increased oxidation rates and lowered activation energies of the reactions taking place. It is postulated that the oxidation mechanism involves a short-lived coordination complex between the organic compound and the homogeneous cocatalyst, such as that of platinum ions or palladium ions and the double bonds of organic compounds, e.g., Ziese's salt anion, the trichloro (ethylene) platinate (II) ion, which is stable in aqueous solution. Similar platinum-organic double-bond complexes are apparently formed in catalyst mixtures of this invention. The standard potential of the iron (II)/iron (III) redox couple in 1.0 M sulfuric acid is +0.69V. The standard potential of platinum (IV)/platinum (II) redox couple in 1.0 M sulfuric acid is also approximately +0.69V. Thus, the platinum (II) species is in equilibrium with the platinum (IV) species, iron (III) and iron (II), and can be considered to be complexed for at least short periods of time to organic double bonds or other appropriate functionality on the organic compounds. The increase in reaction rate produced by platinum, palladium, rhodium and ruthenium is due to the fact that the homogeneous cocatalyst/organic complexes are more long-lived than the electrocatalyst/organic complexes and thus are more efficient at transferring electrons. Lowered activation energies are accounted for by the lower activation energy necessary for formulation of the organic compound-homogeneous cocatalyst complex. The required supply of oxidizing electrons can be derived from direct reduction of the cocatalyst, followed by reoxidation by the electrocatalyst or by formation of a short-lived electrocatalyst/cocatalyst/organic complex in which the cocatalyst compound acts as a bridge to transfer an electron from the organic compound to the electrocatalyst. Thus, the electron transfer complex (ETC) involved in the oxidation forms spontaneously when the homogeneous cocatalyst is added to an electrolyte containing dissolved or suspended organic compounds which have functional groups or bonds capable of interacting with the cocatalyst. The relative weight ratios vary with the type of organic compound, the type of cocatalyst and the electrocatalyst. Preferred ranges of proportions for each component are relatively large amounts of organic material (an activity for the organic of 1 or more), a great concentration of the electrocatalyst (activity of 0.1 to 1.0 or more) and a smaller concentration of the cocatalyst compound (activity of 0.01 to 0.001 or less). The ETC is formed in an electrolyte which solvates the catalysts and at a temperature of 0° C. or higher with an organic material with functionalities which can interact with the cocatalyst, and in the absence of any interfering conditions, such as species which tie up or precipitate the catalysts. The species which precipitate the catalysts are those which form insoluble salts with the catalysts, such as (for the metals), hydroxide, silicate, sulfide, high concentrations of sulfate or high concentrations of phosphate, and (for bromine) silver cation, gold cation or mercury cation. Species or substances which tie up the catalysts include highly absorptive inert materials such as clay or activated carbon, or compounds with which the catalysts react irreversibly, such as the reaction of bromine with some organic compound to form bromoform or tetrabromomethane.

The electrocatalyst is obtained as pure catalyst, from various salts or compounds of the electrocatalyst, or from impurities in the organic material.

The acid solutions usually used in the catalytic system dissolve many metal oxides, sulfides, many metal salts, etc. If any of these compounds exist as impurities in the organic waste used in the reactor, they will be leached out by an acid solution. Iron is one of the most common metals found in sewage sludge, manure and many other biological wastes, and so can supply part or all of the electrocatalyst once leached from the organic material. Bromine or iodine found in sufficient quantity in some waste materials, particularly brominated or iodinated organics, can supply the particularly brominated or iodinated organics, to provide the necessary electrocatalyst concentration. The electrocatalyst is usually added to the electrolyte, as there is not enough normally found in waste materials to develop the desired reaction rate, but some waste materials supply their own electrocatalyst, e.g. when leachable iron, bromine or iodine is present in sufficient quantity in the waste material. It is doubtful that any waste material will contain sufficient quantities of copper, nickel, platinum, vanadium, etc., to supply their own cocatalyst as well, but such is not precluded. Whether the electrocatalyst and cocatalyst are added as metals, metal salts, etc., or leached from the organic waste material does not affect the nature of the process described herein. The catalyst materials are identified by chemical analysis of the waste material to determine catalyst content (if any), and by chemical analysis of the acid electrolyte solution (after it has been thoroughly mixed with the waste and allowed to stand for, e.g., from 24 to 72 hours).

The homogeneous cocatalyst is optionally obtained from pure cocatalyst metal, from various salts or compounds of the cocatalyst, or from impurities in the organic material. The homogeneous cocatalyst is dissolved in or homogeneously distributed throughout the catalyst solution. This is advantageous in that it eliminates one heterogeneous step in the process of transfer of electrons from the electrocatalyst and in that the cocatalyst is available to the entire surface of any solid organic particles immersed in the catalyst solution. The cocatalyst is homogeneous with the electrocatalyst solution, it is a single ion complex (not an admixture), and the homogeneity of the cocatalyst is very critical to the increased reaction rates observed.

The employed electrolyte is any aqueous solution in which the electrocatalyst and cocatalyst are soluble at least in reduced form, but is typically a solution of a strong mineral acid, such as hydrochloric acid, phosphoric acid or sulfuric acid. The acid solution reduces the reduction potential necessary for hydrogen production, while providing a solubilizing medium for the catalyst composition. The system is satisfactorily operated at various temperatures, depending on the catalyst combination and the organic source; temperatures from 70° C. to 200° C. are typical. However, temperatures from 0° C. to 500° C. or more may be used.

The principle advantages of the process are two-fold. Firstly, the process produces electrolytic hydrogen at a potential considerably below that necessary to crack water. The organic/electrocatalyst/homogeneous cocatalyst combination acts as a depolarizing agent to reduce the potential applied at the anode. Using this process, electrolytic hydrogen is produced from inexpensive organic waste material at much lower cost than was formerly possible. Secondly, the process can be used in the electrowinning of metals at potentials lower than those now used, again due to the depolarizing action of the organic/electrocatalyst/homogeneous cocatalyst combination.

Examples of organic material or biomass suitable for practicing the invention are coal, peat, oil shale, woody wastes, cattle manure, garbage, sewage sludge, various industrial chemical wastes, food and fiber processing by-products or waste and grown biomass products, such as bulk grass plants, water plants, etc., or any organic material which can be oxidized by the catalyst solution at a reasonable rate.

Examples of catalyst compositions useful for practicing the invention are various combinations of metal ion complexes and/or oxidizing halogens. The complexes vary and depend upon the composition of the solution and the nature of the organic material. Non-limiting examples of electrocatalysts are cerium (4+) ion complex, iron (3+) ion complex, bromine and iodine. Non-limiting examples of homogeneous cocatalysts are platinum (4+) ion complex, ruthenium (3+) ion complex, rhodium (3+) ion complex, nickel (2+) ion complex, cobalt (2+) ion complex, palladium (2+) ion complex, copper (2+) ion complex and vanadium (5+) oxide complex. The catalyst solutions are made by dissolving the halogen, metal, and/or soluble metal salt in an electrolyte solution. Useful combinations of electrocatalyst and homogeneous cocatalyst include:

bromine with palladium$^{2+}$: (fat)
iron$^{3+}$ with platinum$^{4+}$: (urea, wood cellulose, manure and/or fat)
iron$^{3+}$ with vanadium$^{5+}$: (sewage sludge)
bromine with ruthenium$^{3+}$: (urea, wood cellulose and/or fat)
bromine with vanadium$^{5+}$: (wood cellulose and/or manure)
iron$^{3+}$ with cobalt$^{2+}$: (wood cellulose and/or manure)
iodine with ruthenium$^{3+}$: (urea)
iron$^{3+}$ with palladium$^{2+}$: (fat)
iron$^{3+}$ with nickel$^{+2}$: (manure)

The range of electrocatalyst concentration providing a suitable reaction rate is from 0.01 M up to 100 percent. The preferred range is 0.1 M to 1.0 M. The range of cocatalyst providing an appropriate reaction rate is from 0.0001 M to 0.1 M. The preferred range is from 0.001 M to 0.01 M. The preferred ranges provide economy of operation.

In practicing the invention, an aqueous electrolyte, an electrocatalyst and a homogeneous oxidation cocatalyst are combined for producing hydrogen or electrowinning metals (at the cathode of an electrochemical cell).

Anode materials used in the invention are, for example, platinum, platinum-clad titanium, graphite, reticulated vitreous carbon or platinum plated reticulated vitreous carbon. Suitable anode materials are those materials which do not corrode in the electrolyte and at which the electrode-catalyst redox pair is reversible or quasi-reversible.

Suitable cathode materials are, for example, nickel mesh or platinum or platinum plated reticulated vitreous carbon. Other suitable cathode materials are materials which do not corrode in the electrolyte and at which the hydronium-hydrogen redox couple is reversible or quasi-reversible.

The electrolyte is, for example, phosphoric or sulfuric acid in concentrations varying from 1M to 6M, or potassium sulfate at 0.2M. Other useful electrolytes are those which possess the necessary conductivity, dissolve at least the reduced form of the catalyst, and do not interfere with or poison the catalyst. The electrolyte is made by diluting concentrated sulfuric acid, phosphoric acid or potassium sulfate crystals with water of reasonable purity, e.g. distilled water, deionized water or tap water.

The electrolyte solution optionally has many different compositions. Various other acids which are suitable electrolytes are perchloric acid, hydrobromic acid, hydroiodic acid, nitric acid, boric acid, hydrofluoric acid, or any other strong acid which is not irreversibly degraded in the system. There are a variety of salts which are suitable electrolytes, including sodium or potassium choride, bromide or iodide, iron chloride, bromide or iodide, sodium or potassium phosphate, sodium sulfate, any of the alkali-metal fluorides, any of the alkali or alkaline-earth nitrates or perchlorates, iron nitrate, iron perchlorate, any of the soluble borate salts, any of the soluble aluminum or ammonium salts and any other electrolyte salt or salt mixture which is not irreversibly degraded in the system. The important attributes of the electrolyte are that it is able to solvate at least the reduced form of the electrocatalyst, that it provides a low-resistivity medium between the electrodes and that it does not degrade in the oxidation system.

The operating potential of the system is dependent on the electrocatalyst and the electrolyte. The electrolyte, because of its relatively high concentration, generally determines the form of the electrocatalyst complex (if any), and can shift the redox potential of the electrocatalyst by several tenths of volts. For iron (3+) in 1.0 M phosphoric acid, the standard redox potential is +0.49 volt, and the cell anode is operated at any potential from +0.5 to +1.5 volts or more, versus the normal hydrogen electrode (NHE).

The normal hydrogen electrode (NHE) is an imaginary electrode at which the $H^+/H_2$ redox reaction is perfectly reversible, and which is suspended in solution where the activity of the hydrogen cation is 1.0 and where hydrogen gas at 1.0 atmosphere (activity=1.0) is bubbled over the electrode surface. The potential of this electrode is defined to be 0.000 V, and is the standard of reference for redox potentials of other species. In practice, the electrode is approximated by a piece of platinized platinum (platinum covered with platinum black) in an acid solution of $H^+$ activity 1.0, while hydrogen gas at 1.0 atmosphere is bubbled over the surface ($H_2$ activity+1.0).

The preferred operating range for iron (3+) in phosphoric acid is +0.5 to +0.8 volt. For iron (3+) in 1. M sulfuric acid, the standard redox potential is +0.69 volt, and the cell anode is suitably operated at any potential from +0.70 to +1.5 volts or more, versus the NHE. The preferred potential range at the anode for iron (3+) in sulfuric acid solution is +0.7 to +1.0 volt. For bromine, the standard redox potential is +1.087 volts, and the cell anode is effectively operated at any potential from +1.0 to +1.5 volts or more, versus the NHE. Preferred potential range for bromine is from +1.0 to +1.2 volts versus the NHE. For iodine, the standard redox potential is approximately +0.47 volt, and the cell anode is operated at any potential from +0.5 to +1.5 volts or more, versus the NHE. The preferred potential range for iodine is from +0.50 to +0.70 volt.

Figure 2:
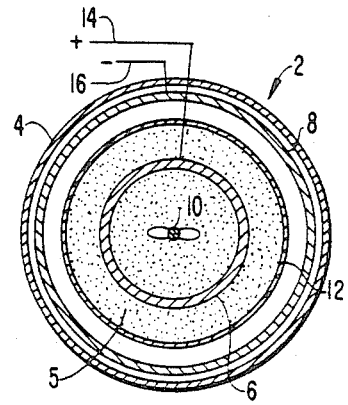
FIG. 2 is a cross-sectional view taken on the plane 2—2 of the cell of FIG. 1.
Figure 3:
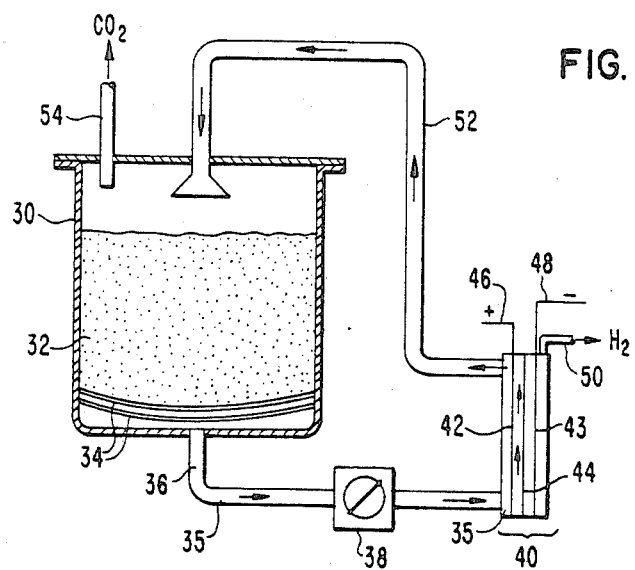
FIG. 3 is a vertical sectional view of apparatus in which the organic reaction area and electrochemical cell are separated.

Referring now to the Figures, FIG. 1 shows an electrochemical cell 2 suitable for practicing the invention. Tank 4 contains electrolyte 5 in which anode 6 and stirrer 10 are immersed. Electrolyte 5 is an electrolyte containing electrocatalyst and homogeneous cocatalyst together with the organic material. Anode 6 and cathode 8 are separated by an ion specific or semi-permeable membrane 12. Anode 6 is connected to lead 14 and cathode 8 is connected to lead 16. Leads 14 and 16 are connected to a source of electric current (not shown). Hydrogen generated in the cathode compartment are removed through conduit 18, and gases generated in the anode compartment are removed through conduit 20. FIG. 2 is a top view of the electrochemical cell 2, showing circular anode 6, circular cathode 8 and anode electrolyte solution 5 containing the electrolyte, electrocatalyst and homogeneous cocatalyst, together with the organic material. Ion specific or semi-permeable membrane 12 is shown as a circular separator between the anode and cathode compartments. FIG. 3 shows tank 30 which contains a mixture 32 of electrolyte, electrocatalyst, homogeneous cocatalyst and organic material resting on optional filter screen 34. Organic material is reacted with electrolyte and catalyst combination in tank 30, and electrolyte solution 35 flows through exit 36 via pump 38 to electrochemical cell 40, which contains electrolyte solution 35 in which anode 42 is immersed. Anode 42 and cathode 43 are separated by ion specific or semi-permeable membrane separator 44. Anode 42 is connected to lead 46, and cathode 43 is connected to lead 48. Leads 46 and 48 are connected to a source of electric current (not shown). Hydrogen generated at the cathode is led off at exit 50. Solution from the anode compartment is returned by conduit 52 to tank 30 for reuse. Gases generated in tank 30 are withdrawn therefrom through conduit 54. Organic material in tank 30 is mixed with catalyst solution by percolation, spraying, stirring, density gradient or other method. Catalyst which is reduced in tank 30 is reoxidized in electrochemical cell 40 before being returned to tank 30.

The electrocatalyst is regenerated from the reduced form by oxidation at the anode. There may be some reoxidation of reduced cocatalyst at the anode, but this is minimal compared with the reoxidation of the electrocatalyst since the cocatalyst is largely not consumed.

The electrochemical cells shown in FIGS. 1 to 3 are non-limiting examples of the invention. The electrochemical cell may be configured as a cylinder, a sphere or other appropriate shape. The anode compartment is alternatively the inner compartment, the outer compartment, or either compartment in a cell in which the electrodes are planar. The separator is, optionally, an ion-specific membrane or any semipermeable barrier.

Suitable ion-specific membranes include cation-specific membranes, for example, Ionics 61 CZL-386 (manufactured by Ionics, Inc.) and Nafion 423 (manufactured by DuPont). The semi-permeable membrane is, e.g., a microporous plastic, sintered (fritted) glass, a gel, such as agar, or any other material which restricts fluid flow and does not allow intimate mixing of the anolyte and catholyte. The Ionics 61 CZL-386 membrane is a modacrylic fiber-backed cation-transfer membrane. Either an ion-specific of a semi-permeable membrane may be used, but the use of ion-specific membranes leads to higher electrochemical cell efficiency since they strongly limit the diffusion of the electrocatalyst between the catholyte and the anolyte. Semipermeable membranes are generally less expensive but do not provide as much of a barrier to electrocatalyst diffusion, thus lowering the efficiency of the electrochemical cell in comparison with a cell using an ion-specific membrane.

Other operating limitations are principally imposed by the materials used in construction of the reactor system. The system may be built of very inert, strong, expensive materials, such as quartz-lined steel, and operated at relatively high temperatures (100° to 500° C. or more) or it may be made from inexpensive materials, such as polypropylene or polyethylene and ordinary glass, and operated at temperatures of 20° C. to 120° C. Electrode materials must not corrode at the operating temperature of the electrochemical cell. Another limitation is the necessity to operate below the critical temperature of the electrolyte solution being used.

Elevated temperatures are used when depolarization is effected with a refractory organic compound, such as lignin, chitin or a saturated aliphatic hydrocarbon; or when excess heat energy is available at low cost and a lower redox potential electrocatalyst (for example, iron in phosphoric acid, or iodine) can be used to reduce electrical costs. When a lower-potential electrocatalyst has an unacceptable reaction rate at, e.g., 70° C., it is not precluded from oxidizing the organic compound at an adequate rate at, e.g. 250° C. The pressure in the system may vary and is dependent on the nature of the electrolyte and the electrocatalyst. A concentrated sulfuric acid solution does not reach one atmosphere (14.7 psia) pressure until 330° C., and concentrated phosphoric acid has a similar low pressure at elevated temperature.

Potential applied to the anode is kept as low as possible to maximize the energy efficiency of the system. An increase in temperature increases the reaction rate and reduces the necessary size of the reactor for producing a given amount of hydrogen or metal. Operating the anode at a higher potential drives the reaction more quickly but is of limited utility beyond about 0.2 to 0.3 volt more (positive) than the electrocatalyst redox potential. The acidity of the electrolyte solution affects the reaction rate by aiding in the decomposition of some organic compounds due to dehydration and other acid catalyzed reactions. With woody organic material greater acid concentrations are particularly effective in increasing the electrocatalytic oxidation reaction rate, due to breakdown of the cellulose chains.

For hydrogen production or metal electrowinning maximum energy efficiency must be achieved with the given organic material used. The reactions at the anode and cathode must be as reversible as possible, so that little overpotential is needed. Preferred materials for the cathode are platinum, platinum-doped carbon, platinum-clad titanium, platinum-clad niobium, nickel or nickel-doped carbon. Platinum, platinum-clad titanium or niobium, platinum-doped carbon or carbon are preferred materials for the anode. The preferred electrolyte solution depends on the electrocatalyst used and the type of organic material. Several satisfactory combinations (useful for hydrogen production) are exemplified below:

0.1 M iron (3+)/0.1 M cobalt (2+)/wood cellulose/6M sulfuric acid;

0.1 M iron (3+)/0.01 M vanadium (V)/sewage sludge/6M sulfuric acid;

0.01 M bromine/0.01 M vanadium (5+)/wood cellulose or manure/6M sulfuric acid;

0.01 M bromine/0.001 M ruthenium (3+)/urea, cellulose or fat/6M sulfuric acid; and 0.1 M iron (3+)/0.001 M platinum (4+)/urea, cellulose or fat/6M sulfuric acid.

The operating potential of the anode is maintained at +0.5 to +1.5 volt versus the NHE, and temperatures of operation are typically from 20° C. to 200° C. With more inert, stronger materials of construction for the apparatus the operating temperature may be 500° C. or more. Lower temperatures require less energy expended in heating the system.

Table I, below, tabulates non-limiting examples of organic material, electrocatalyst, homogeneous cocatalyst, electrolyte, reaction rate, and activation energy, particularly pointing out the advantageous effect when a homogeneous cocatalyst is used in combination with an electrocatalyst contrasted with the use of the electrocatalyst alone. The reaction rate is significantly increased using the combination of electrocatalyst and homogeneous cocatalyst of the invention.

In practicing the invention, the mechanism of organic oxidation is changed by addition of the homogeneous cocatalyst to the electrocatalyst and by formation of an electron transfer complex involving the electrocatalyst, homogeneous cocatalyst and the organic material. The electron transfer complex has not been characterized but its presence is demonstrated by the reduced activation energies and/or increased reaction rates in the presence of homogeneous cocatalyst as opposed to use of the electrocatalyst alone, as shown in Table I. The use of the combination of electrocatalyst and homogeneous cocatalyst of the invention results in an increase in reaction rate and a decrease in activation energies.

TABLE I

| Organic | Electrocatalyst | Homogeneous Cocatalyst | Electrolyte | Reaction Rate (sec$^{-1}$) | $E_A$ (kcal/mole) |
|---|---|---|---|---|---|
| wood cellulose | iron (III) | none | 6. $\underline{M}$ H$_2$SO$_4$ @ 50° C. | 1.4 × 10$^{-6}$ | 12. |
| wood cellulose | iron (III) | cobalt (II) | 6. $\underline{M}$ H$_2$SO$_4$ @ 50° C. | 4.1 × 10$^{-6}$ | 11.3 |
| wood cellulose | iron (III) | platinum (IV) | 6. $\underline{M}$ H$_2$SO$_4$ @ 50° C. | 3.6 × 10$^{-6}$ | 8.1 |
| beef fat | iron (III) | none | 1.0 $\underline{M}$ H$_2$SO$_4$ @ 20° C. | <1 × 10$^{-9}$ | — |
| beef fat | iron (III) | platinum (IV) | 1.0 $\underline{M}$ H$_2$SO$_4$ @ 20° C. | 4.7 × 10$^{-7}$ | 4.5 |
| beef fat | iron (III) | palladium (II) | 1.0 $\underline{M}$ HCl @ 20° C. | 2.2 × 10$^{-6}$ | — |
| urea | iron (III) | none | 1.0 $\underline{M}$ H$_2$SO$_4$ @ 20° C. | 4. × 10$^{-9}$ | — |
| urea | iron (III) | ruthenium (III) | 1.0 $\underline{M}$ H$_2$SO$_4$ @ 20° C. | 2.2 × 10$^{-8}$ | — |
| urea | iron (III) | platinum (IV) | 1.0 $\underline{M}$ H$_2$SO$_4$ @ 20° C. | 1.2 × 10$^{-6}$ | 4.8 |
| urea | iodine | none | 1.0 $\underline{M}$ H$_2$SO$_4$ @ 20° C. | <1 × 10$^{-9}$ | — |
| urea | iodine | ruthenium (III) | 1.0 $\underline{M}$ H$_2$SO$_4$ @ 20° C. | 5. × 10$^{-9}$ | — |
| urea | bromine | none | 1.0 $\underline{M}$ H$_2$SO$_4$ @ 20° C. | 2.0 × 10$^{-5}$ | — |
| urea | bromine | ruthenium (III) | 1.0 $\underline{M}$ H$_2$SO$_4$ @ 20° C. | 2.6 × 10$^{-4}$ | 8.6 |
| cellulose | bromine | none | 0.2 $\underline{M}$ K$_2$SO$_4$ @ 20° C. | 1.6 × 10$^{-6}$ | — |
| cellulose | bromine | platinum (IV) | 0.2 $\underline{M}$ K$_2$SO$_4$ @ 20° C. | 2.9 × 10$^{-6}$ | — |
| cellulose | bromine | rhodium (III) | 0.2 $\underline{M}$ K$_2$SO$_4$ @ 20° C. | 8.6 × 10$^{-6}$ | — |
| cellulose | bromine | ruthenium (III) | 0.2 $\underline{M}$ K$_2$SO$_4$ @ 20° C. | 1.7 × 10$^{-5}$ | 12. |
| cellulose | bromine | none | 6.0 $\underline{M}$ H$_2$SO$_4$ @ 50° C. | 1.6 × 10$^{-5}$ | 10.6 |
| cellulose | bromine | vanadium (V) | 6.0 $\underline{M}$ H$_2$SO$_4$ @ 20° C. | 4.7 × 10$^{-5}$ | 11.4 |

TABLE I-continued

| Organic | Electrocatalyst | Homogeneous Cocatalyst | Electrolyte | Reaction Rate (sec$^{-1}$) | $E_A$ (kcal/mole) |
|---|---|---|---|---|---|
| cellulose | none | vanadium (V) | 6.0 M H$_2$SO$_4$ @ 20° C. | <1. × 10$^{-6}$ | — |
| fat | bromine | none | 0.2 M K$_2$SO$_4$ @ 20° C. | 1.9 × 10$^{-6}$ | — |
| fat | bromine | palladium (II) | 0.2 M K$_2$SO$_4$ @ 20° C. | 2.9 × 10$^{-6}$ | — |
| fat | bromine | ruthenium (III) | 0.2 M K$_2$SO$_4$ @ 20° C. | 9.3 × 10$^{-6}$ | 11.1 |
| cattle manure | iron (III) | none | 6.0 M H$_2$SO$_4$ @ 50° C. | 4.0 × 10$^{-7}$ | 12.3 |
| cattle manure | iron (III) | platinum (IV) | 6.0 M H$_2$SO$_4$ @ 50° C. | 1.1 × 10$^{-6}$ | — |
| cattle manure | iron (III) | cobalt (II) | 6.0 M H$_2$SO$_4$ @ 50° C. | 1.2 × 10$^{-6}$ | 8.0 |
| cattle manure | iron (III) | nickel (II) | 6.0 M H$_2$SO$_4$ @ 50° C. | 8.0 × 10$^{-7}$ | — |
| cattle manure | bromine | none | 6.0 M H$_2$SO$_4$ @ 50° C. | 7.6 × 10$^{-6}$ | 10.0 |
| cattle manure | bromine | vanadium (V) | 6.0 M H$_2$SO$_4$ @ 50° C. | 1.1 × 10$^{-5}$ | 5.1 |
| sewage sludge | iron (III) | none | 6.0 M H$_2$SO$_4$ @ 50° C. | 1.2 × 10$^{-6}$ | 18.7 |
| sewage sludge | iron (III) | vanadium (V) | 6.0 M H$_2$SO$_4$ @ 50° C. | 3.8 × 10$^{-6}$ | 13.3 |

The invention is further illustrated by the following examples in which all parts and percentages are by weight unless otherwise indicated. These non-limiting examples are illustrative of certain embodiments designed to teach those skilled in the art how to practice the invention and represent the best mode contemplated for carrying out the invention.

EXAMPLES

Example 1

A catalyst solution of 1.0 M sulfuric acid containing 0.1 M iron (III) and 0.001 M platinum (IV) is prepared by diluting 0.055 liter of concentrated sulfuric acid, 20 grams of iron (III) sulfate, and 0.410 grams of chloroplatinic acid to one liter with water. 70 Grams of urea are then added to the solution. The solution is stirred to dissolve the salts and 600 ml of solution is transferred to the anode half-cell of FIG. 1; a solution of 1.0 M sulfuric acid is added to the cathode half-cell. These two solutions are the anolyte and the catholyte, respectively. The anode is a platinum-clad titanium wire mesh formed into a cylindrical shape, and the cathode is a cylindrical shape formed of fine nickel wire mesh. Both electrodes are totally immersed in solution. A Teflon ®-coated stirring bar is used to agitate the solution in the anode half-cell, and an Ionics 61 CZL-386 cation-specific membrane is used to separate the two half-cells. The cell is sealed and maintained at 30° C., and a D.C. potential of approximately 1.0V is applied across the electrodes, resulting in a current of 7 mA. After a 100 hour test period, the hydrogen generated is purged and analyzed by gas chromatography, giving a hydrogen generation efficiency value of 99%, approximately 20% of the urea being consumed. For the anode half-cell solution reaction, the reaction rate constant is 1.2×10$^{-6}$ sec$^{-1}$ and the activation energy is 4.8 kcal/mole.

Example 2

The reactor tank of FIG. 3 is loaded with a supported bed of 500 grams of wood chips over filters of 1.0 mm and 0.25 mm Teflon ® screen. A solution of 6.0 M sulfuric acid containing 0.2 M iron (III) and 0.01 M cobalt (II) is prepared by diluting 3.3 liters of concentrated sulfuric acid, 400 grams of iron (III) sulfate and 15.5 grams of cobalt (II) sulfate to 10 liters with water. The solution is agitated to dissolve the salts and then transferred into the reactor tank. The electrodes in the electrochemical cell are a 20 pores/inch reticulated vitreous carbon (RVC) anode and a platinum-plated 20 pores/inch RVC cathode, separated by a Nafion ® 423 cation-specific membrane. A potential of 1.0 volt is applied across the electrodes. The reactor tank is sealed, and the catalyst solution is pumped from the tank through the electrochemical cell and back into the tank. The reactor tank is heated to about 80° C. giving a current level of 0.5 to 2.0 amperes. The reaction tank volume is about twice the volume of the solution in liters, the reaction rate is about 1×10$^{-4}$ sec$^{-1}$ and the activation energy is 11.3 kcal/mole. The electrochemical cell is operated at more than 95 percent efficiency, and about 13 cubic feet of hydrogen is produced, as determined by gas chromatographic analysis during 100 hours of operation.

Example 3

A catalyst solution of 1.0 M sulfuric acid containing 0.01 M cobalt and 0.1 M iodine is prepared by diluting 0.055 liter of concentrated sulfuric acid, 1.57 g. cobalt (II) sulfate and 12.7 g. iodine crystals to one liter with water. The reactor cell of FIG. 1 is loaded with 15 g. of potato starch in the inner (anode) chamber. The catalyst solution is added to the outer (cathode) chamber. Each electrode is platinum-clad titanium mesh formed into a cylinder, and the half-cells are separated by a supported Nafion ® 423 cation-specific membrane. The reactor cell is sealed and heated to 120° C., and a potential of +0.70 volts is applied to the anode versus the cathode. The resulting reaction rate is approximately 1.7×10$^{-5}$ sec$^{-1}$, with the iodine/starch reaction activation energy equal to 13.2 kcal/mole. About 1.7×10$^{-5}$ moles hydrogen/second are produced at the cathode, at an efficiency of nearly one hundred percent. The starch is consumed in a little over eight hours.

Further examples of systems operated at higher temperatures are shown in Table II.

Variations and modifications may be effected within the scope of the invention as described above, and as defined in the appended claims. Throughout the disclosure and claims all references to "homogeneous cocatalyst" mean that the cocatalyst is substantially uniformly dispensed throughout the electrolyte.

TABLE II

| EXAMPLES OF SYSTEMS AT HIGHER TEMPERATURES | | | | |
|---|---|---|---|---|
| Electrocatalyst | Cocatalyst | Electrolyte Medium | Temperature | Pressure |
| 0.2 M Iron (III) | 0.001 M Platinum (IV) | 6 M H$_2$SO$_4$ | 100.° C. | <15 psia |
| 0.2 M Iron (III) | 0.01 M Cobalt (II) | H$_2$SO$_4$ | 330.° C. | ~15 psia |
| 0.2 M Iron (III) | 0.01 M Vanadium (V) | H$_3$PO$_4$ | 200.° C. | <15 psia |

TABLE II-continued
EXAMPLES OF SYSTEMS AT HIGHER TEMPERATURES

| Electrocatalyst | Cocatalyst | Electrolyte Medium | Temperature | Pressure |
|---|---|---|---|---|
| Bromine | 0.01 $\underline{M}$ Vanadium (V) | HBr | 225.° C. | ~2000 psia |
| 0.2 $\underline{M}$ Iron (III) | 0.001 $\underline{M}$ Platinum (IV) | $AlCl_3$ | 200.° C. | ~40 psia |
| Bromine | 0.001 $\underline{M}$ Ruthenium (III) | 6 $\underline{M}$ $H_2SO_4$ | 110.° C. | ~30 psia |
| Iodine | 0.01 $\underline{M}$ Copper (I) | $H_2SO_4$ | 265.° C. | ~75 psia |
| 0.2 $\underline{M}$ Cesium (IV) | 0.001 $\underline{M}$ Palladium (II) | 6 $\underline{M}$ NaCl | 225.° C. | ~300 psia |

What is claimed is:

1. A catalyst combination comprising
   (a) an electrocatalyst, and
   (b) a homogeneous cocatalyst,
   Wherein the catalyst combination is catalytic means for reducing positively-charged ions at a cathode in an electrocatalytic or mediated process of treating organic waste material in an aqueous electrolyte, the positively-charged ions comprising at least one member selected from the group consisting of hydrogen ions and metal ions.

2. A catalyst combination of claim 1 wherein the electrocatalyst is a member selected from the group consisting of cerium (4+) complex, iron (3+) complex, bromine and iodine.

3. A catalyst combination of claim 1 wherein the homogeneous cocatalyst is a member selected from the group consisting of platinum (4+) ion complex, ruthenium (3+) ion complex, rhodium (3+) ion complex, nickel (2+) ion complex, cobalt (2+) ion complex, palladium (2+) ion complex and vanadium (5+) oxide complex.

4. A catalyst combination of claim 3 wherein the electrocatalyst is a member selected from the group consisting of cerium (4+) complex, iron (3+) complex, bromine and iodine.

5. A method for treating organic material comprising combining organic waste material with an electrolyte and a catalyst combination of claim 1, and maintaining an electric potential across an anode and a cathode in an electrochemical cell containing the electrolyte and the catalyst combination, whereby positively charged ions are reduced at the cathode in an electrocatalytic, or mediated process, said positively charged ions comprising at least one member selected from the group consisting of hydrogen ions and metal ions.

6. A method of claim 5 comprising admixing the organic material with an electrolyte and catalyst composition in the electrochemical cell.

7. A method of claim 5 comprising separating the anode from the cathode in the electrochemical cell by interposing an ion-specific membrane therebetween.

8. A method of claim 5 comprising separating the anode from the cathode in the electrochemical cell by interposing a semi-permeable membrane therebetween.

9. A method of claim 5 comprising treating the organic material in a tank, circulating electrolyte solution containing the catalyst combination in reduced form to the electrochemical cell for reoxidation of the electrocatalyst and homogeneous cocatalyst, and recirculating the electrolyte containing electrocatalyst and homogeneous cocatalyst to the tank for treating organic material.

10. A method of claim 9 comprising separating the anode from the cathode in the electrochemical cell by interposing an ion-specific membrane therebetween.

11. A method of claim 9 comprising separating the anode and the cathode in the electrochemical cell by interposing a semipermeable membrane therebetween.

12. A method of claim 9 comprising dissolving the catalyst combination in its reduced form in the electrolyte solution.

13. A method of claim 5 which is carried out at 0° C. to 500° C.

14. A method of claim 5 wherein the anode is constructed of a material selected from the group consisting of platinum, platinum-doped carbon, platinum-clad titanium, niobium, graphite, reticulated vitreous carbon and platinum-plated reticulated vitreous carbon.

15. A method of claim 5 wherein the cathode is constructed of a material selected from the group consisting of platinum, platinum plated reticulated vitreous carbon, platinum-doped carbon, platinum-clad titaniumm, niobium, nickel and nickel-doped carbon.

16. A method of claim 5 wherein the anode is maintained at an operating potential of +0.5 to +1.5 volt, versus that of the normal hydrogen electrode.

17. A method for reducing the energy required for producing hydrogen or electrowinning metals by reacting organic material electrochemically using the catalyst combination of claim 1.

18. An aqueous electrolyte composition comprising a catalyst combination of claim 1.

19. A reaction composition comprising organic material and the aqueous electrolyte composition of claim 18.

* * * * *

UNITED STATES PATENT AND TRADEMARK OFFICE
CERTIFICATE OF CORRECTION

PATENT NO. : 4,699,700
DATED : October 13, 1987
INVENTOR(S) : Patrick M. DHOOGE

It is certified that error appears in the above-identified patent and that said Letters Patent are hereby corrected as shown below:

Column 3, line 31, "of the catalyst and" should read --of the cocatalyst and--.

Signed and Sealed this

Seventeenth Day of May, 1988

Attest:

Attesting Officer

DONALD J. QUIGG

Commissioner of Patents and Trademarks